July 5, 1938.    D. R. BERLIN ET AL    2,122,449
AIRCRAFT CABIN
Filed Oct. 16, 1937    2 Sheets-Sheet 1

INVENTORS
DONOVAN R. BERLIN.
WILLIAM O. WATSON.
BY
ATTORNEY

July 5, 1938.    D. R. BERLIN ET AL    2,122,449
AIRCRAFT CABIN
Filed Oct. 16, 1937    2 Sheets-Sheet 2
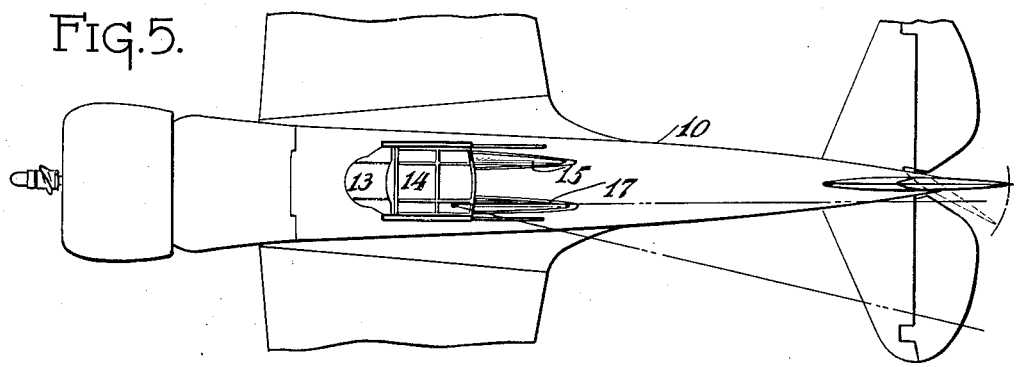
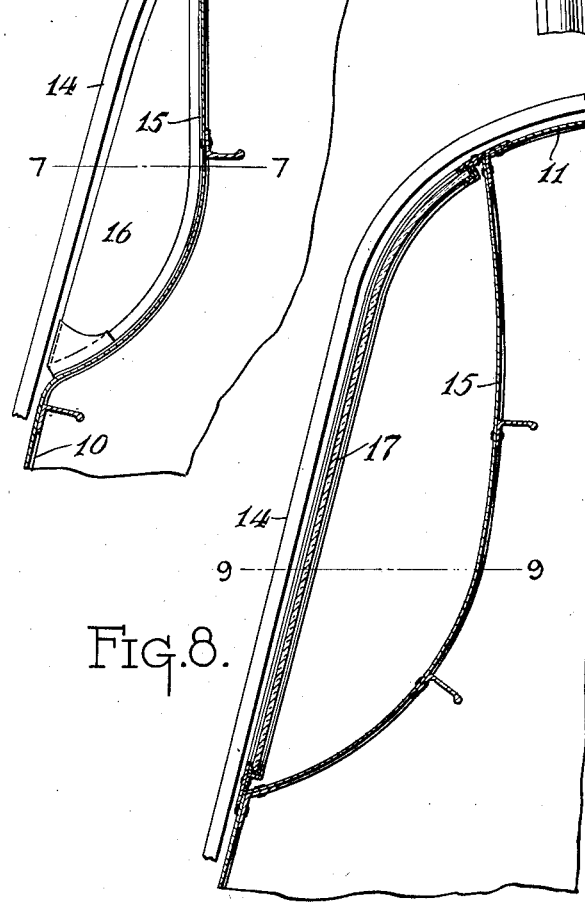
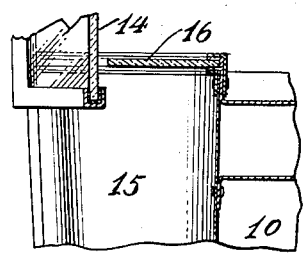
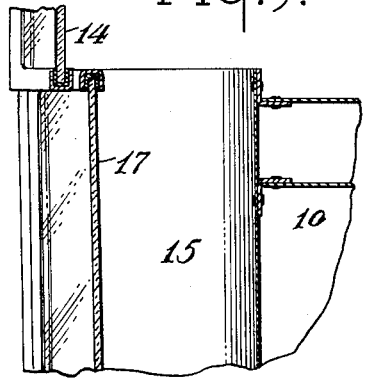
INVENTORS
DONOVAN R. BERLIN and
BY WILLIAM O. WATSON.
ATTORNEY Patented July 5, 1938

2,122,449

UNITED STATES PATENT OFFICE 2,122,449

AIRCRAFT CABIN

Donovan R. Berlin, Eggertsville, and William O. Watson, Kenmore, N. Y., assignors to Curtiss-Wright Corporation, a corporation of Delaware Application October 16, 1937, Serial No. 169,356

6 Claims. (Cl. 244—129)

This invention relates to aircraft cabin arrangements and provides means by which the range of vision of the pilot of a single place aircraft may be increased without sacrificing cleanness of line to maintain minimum drag characteristics in the aircraft.

In early types of open cockpit aircraft, a wind shield was provided forward of the cockpit and usually a head rest contoured to the shape of the human head was provided at the rear of the cockpit. For the sake of decreasing the drag of the head rest, a cone shaped streamline continuation was provided. From this type of cockpit arrangement, improvements have been incorporated such as a transparent cockpit closure providing a rearward streamline continuation of the wind shield and affording protection for the pilot. To carry out the streamline effect to the best possible degree the rear deck portion of the fuselage was raised so that its cross-sectional shape was substantially the same as the cross-sectional shape of the fuselage plus the cockpit closure. The present invention contemplates improvements in the last indicated form of cockpit and fuselage arrangement and the primary object of the invention is to provide for improved range of vision for the pilot in an aircraft of this type. Further objects of the invention will become apparent in reading the annexed description and viewing the drawings in which Fig. 1 is a perspective elevation of an aircraft of old type;

Fig. 5 is a plan of the aircraft of Fig. 4;

Fig. 6 is a section through a portion of the aircraft fuselage of Fig. 2 rearward of the cockpit;

Fig. 7 is a section on the line 7—7 of Fig. 6;

Fig. 8 is a section through the aircraft fuselage shown in Figs. 4 and 5, rearward of the cockpit, and Fig. 9 is a section on the line 9—9 of Fig. 8.

Figure 1:
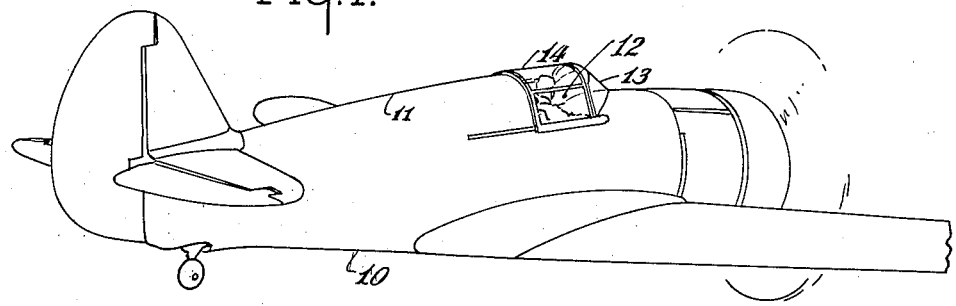

Figure 1 represents the old form of design typifying a metallic fuselage 10 provided with a raised deck 11 rearward of a cockpit 12, the latter being provided with a wind shield 13 and a slidable transparent cockpit closure 14. In this construction the deck 11 is substantially similar in cross-section to that of the cockpit closure 14, and due to the width of the deck, the pilot is not able to see more than a few degrees rearwardly and laterally of a transverse line through the cockpit, due to the opaque edges of the deck which provide a rear border for the cockpit.

Figure 2:
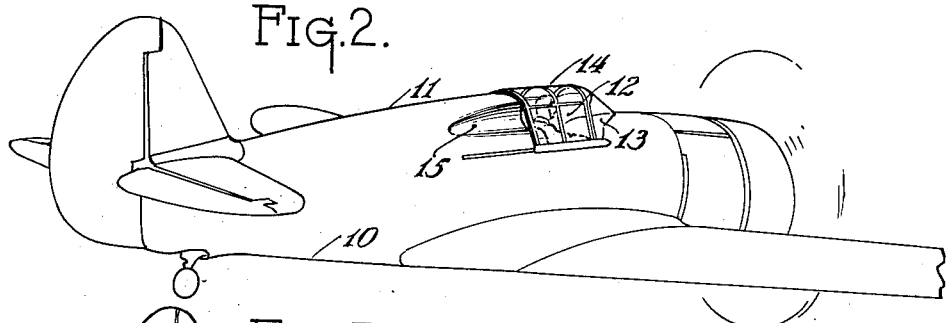
Fig. 2 is a perspective elevation of an aircraft having reasonably effective facilities for increasing the range of vision of the pilot.
Figure 3:
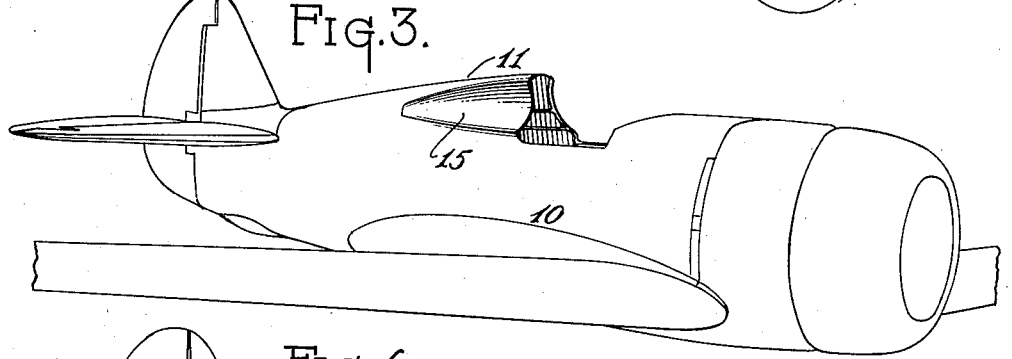
Fig. 3 is an elevation of an aircraft according to a second arrangement of the present invention with certain of the elements removed.
Figure 4:
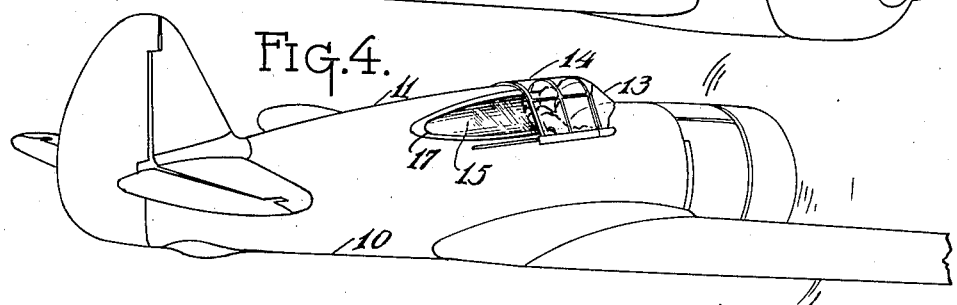
Fig. 4 is a perspective elevation of an aircraft fitted with the second arrangement of the improvements of this invention.

To overcome this condition, vision improvement is suggested as shown in Figs. 2, 6 and 7 in which the deck 11 is provided with longitudinal tapering grooves 15 extending from the cockpit 12 rearwardly of the deck so that the pilot, by turning his head, may look nearly directly behind him. The details of this construction are shown in Figs. 6 and 7, and it will be noted that a window 16, extending transversely, closes the space between the surface of the groove 15 and the cockpit closure 14. Although this construction permits an adequate range of vision for the pilot, the sharp break at the trailing edge of the cockpit closure 14 sets up undesired turbulence with consequent increase in drag. Since design trends now involve no compromising with optimum streamlining, the alternative arrangement shown in Figs. 4, 8 and 9 is shown wherein the grooves 15 afford the pilot an excellent range of vision, and are covered with windows 17 profiled in cross-section like the cockpit closure 14 and extending rearwardly to blend with the oval form of the deck 11 and the fuselage 10. In effect, all cross-sections of the aggregate fuselage from the wind shield rearwardly are of substantially oval form, so that the best possible streamlining for the aggregate fuselage is obtained with no sacrifice in streamline form. Yet, full range of vision is provided for the pilot by the use of the grooves 15 covered by the windows 17.

It should be noted that the fuselage skin in aircraft of this kind comprises stressed structural elements and in the present invention, the skin which defines the grooves 15 and the deck 11 is integral with and forms part of the fuselage structure. It might be supposed that part of the internal skin or structure defining the groove 15 could be omitted, but this would produce unfavorable strength characteristics. Also, it might be supposed that the transparent member 17 could be extended to provide a large part of the rear fuselage deck but this likewise would be unfavorable since transparent materials such as glass or cellulose derivatives are much heavier than metallic sheets such as are used for stressed structures and accordingly, the amount of transparent material must be kept to a minimum in order to save weight. The arrangements herein shown and described are believed to present a very favorable organization from the standpoint of range of visibility and weight economy.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In aircraft, a fuselage having a cockpit cutout, a transparent top over said cockpit forming a forward streamlined prolongation of the fuselage form, said cockpit having accommodations for a pilot so arranged that the pilot's head is above the lateral cockpit edges and forward of the rear fuselage portion, laterally disposed tunnels formed in the fuselage above the cockpit edge to provide rearward and lateral vision for the pilot, and transparent covers for said tunnels disposed to form streamlined continuations of the fuselage form.

2. In aircraft, a streamlined fuselage of oval cross-sectional profile having a cockpit cutout intermediate its length, a rear wall for said cockpit substantially vertically disposed, bordered by the fuselage form, and of greater width than the shoulders of an average person, said rear wall having a concave cutout laterally disposed on each side of the fuselage plane of symmetry providing a net wall width, at the head level of a person, substantially equal to the width of the person's head, said fuselage having longitudinal depressions forming rearward continuations of said wall cutouts, and transparent covers over said depressions carrying out the streamlined oval form of the fuselage.

3. An aircraft fuselage including a cockpit and a raised streamlined deck rearward thereof, the fuselage and deck together having an oval section, said deck having longitudinally extending laterally disposed grooves permitting crew vision rearwardly of the cockpit, and transparent enclosures for said grooves conforming to said oval section.

4. In a combination an aircraft fuselage having a cockpit and a relatively narrow headrest extending above the rearward border of the cockpit, a transparent cockpit closure of substantially oval section having its top coextensive in height with the top of said headrest but its sides spaced farther apart than the sides of said headrest, and transparent means extending rearwardly from said closure, to provide a streamlined oval rearward fairing from the top of said headrest to the sides of said fuselage.

5. An aircraft fuselage of streamlined form and oval cross-section having longitudinally extending tapering grooves in the surface thereof, and transparent windows covering said grooves, the windows being arcuate in cross-sectional profile to conform to the oval fuselage form.

6. An aircraft fuselage of streamlined form and oval cross section having longitudinally extending tapering grooves in the surface thereof, and having a cockpit whose lateral borders are below respective grooves, said cockpit having a rearward border intersected by said grooves, windows of arcuate profile conforming to the oval fuselage form covering said grooves, and a transparent closure over said cockpit forming a forward streamlined prolongation of said fuselage and windows.

DONOVAN R. BERLIN.
WILLIAM O. WATSON.